Patented Aug. 13, 1940

2,211,662

UNITED STATES PATENT OFFICE 2,211,662

QUINALDINE DYE INTERMEDIATES AND QUINOPHTHALONE DYES THEREOF

Lucas P. Kyrides, Webster Groves, Mo., assignor to Monsanto Chemical Company, St. Louis, Mo., a corporation of Delaware No Drawing. Application September 2, 1936, Serial No. 99,097

6 Claims. (Cl. 260—283)

This invention relates to the manufacture of dyestuffs of the quinoline yellow series and it relates particularly to certain new dyestuffs of this series which are characterized by their fastness and desirable shade of yellow having a green tone.

Quinoline yellow of commerce is made by condensing quinaldine with phthalic anhydride under conditions whereby water "splits out" to form quinophthalone. By sulfonating quinophthalone the water soluble dyestuff is obtained. The dyestuff is used extensively for dyeing silk and wool, or in the preparation of color lakes.

Contrasted with the known quinoline yellow, my yellow dyestuffs possess a rich greenish tone which is a much desired quality in yellow dyestuff and is of excellent fastness.

According to the present invention, ortho or para aminodiphenyl or its chlorine substituted products having a free nuclear hydrogen adjacent to the amino group is condensed with croton-aldehyde, acetaldol, paraldehyde, acetaldehyde and the like, by known methods to form the quinaldine. The resulting quinaldine is condensed with phthalic anhydride to form the corresponding quinophthalone which is spirit soluble and possesses dyeing properties.

The quinophthalone is sometimes referred to as quinoline yellow base. By sulfonation and salting out, the base is converted into water soluble form, in which form it is suitable for use in dyeing and for the preparation of color lakes.

The following specific examples illustrating the applications of the principles of my invention include the preparation of the dyestuff intermediates:

QUINALDINE INTERMEDIATES

To produce the phenyl substituted quinaldines, one may use the known methods for producing quinaldine. For example, the method described in my Patent No. 1,752,492, has been found applicable and gives good results.

Example 1

8-phenyl quinaldine having the formula:

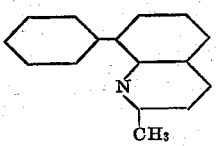

may be obtained conveniently by heating under refluxed and agitated conditions 211 parts of ortho aminodiphenyl, 340 parts of commercial muriatic acid, 1.16 sp. gr., 44 parts nitrobenzene and 94 parts water. Complete solution is obtained at 97–102° C. after which 102 parts of freshly distilled croton-aldehyde (which may contain a trace of hydroquinone) are added over a period of 45 minutes, while maintaining a temperature range as indicated above. After all the croton-aldehyde is added, the mixture is maintained for an additional period of one hour after which the charge is cooled to a temperature of 8° C.

One convenient method of purification involves removing impurities by diazotization. To this end, sufficient sodium nitrite solution (approximately 38 parts $NaNO_2$ will usually be found sufficient) is then added to reach an end point with starch-iodide paper. The resulting reacted mixture is warmed to about 35° C. after which the crystalline product is filtered and washed with toluol. The needle-like crystals are dissolved in boiling water to which there may be added a small amount of absorptive carbon, the solution is filtered and neutralized with caustic soda until it is just alkaline, whereupon a greenish oil separates.

The oil is fractionally distilled. The fraction boiling at 171–172.5° C. at 5 mm. being collected separately. The product so obtained is 8-phenylquinaldine, melting point approximately 70° C.

An additional quantity of product may be obtained by extraction of the aqueous mother liquor from which the crystals, mentioned in the preceding paragraph, were filtered.

Example 2

6-phenylquinaldine is obtained in an analogous manner by substituting the para aminodiphenyl for the ortho aminodiphenyl in Example 1.

Example 3

5-chloro-8-(parachlorphenyl)-quinaldine having the formula:

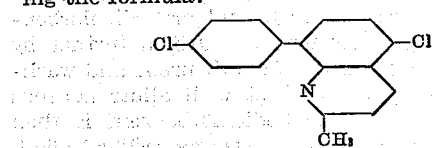

is obtained by substituting 4-4'-dichlor-2-aminodiphenyl, for the 2-aminodiphenyl in Example 1. To this end 118.8 parts of 4-4'-dichlor-2-aminodiphenyl, 75.5 parts of ninety-three per cent sulfuric acid dissolved in 150 parts of water, and 17.6 parts of nitrobenzene are heated to and maintained at approximately 100 C. under agitated and refluxed conditions after which 40.4 parts of freshly distilled croton-aldehyde are added over a period of 35–40 minutes. The agitation is continued while maintaining the temperature for an additional 35–40 minutes or longer if desired. By neutralizing the aqueous layer until it is just short of alkaline to litmus, a tan solid precipitate is formed which is filtered and air dried. After drying, the product is distilled. The fraction boiling at 186–190° C. at 2.5 mm. is recovered separately. By recrystallizing this fraction from petroleum naphtha, a product which melts at 130° C. is obtained.

*Example 4*

Corresponding quinaldines may be obtained from the 4-chlor-2-aminodiphenyl, the 4′chlor-2-aminodiphenyl and the 2′chlor-4-aminodiphenyl. The conditions best suited in each case to obtain the maximum yield will vary to some extent. It is to be understood that such conditions or the method of synthesis by which the quinaldines are obtained, form no part of the present invention, nor is the invention limited by such conditions or by any specific method used in the preparation of the foregoing quinaldine intermediates.

It is to be noted that other oxidizing agents in place of nitrobenzene may be used in the condensation of the amines with croton-aldehyde, etc. Such oxidizing agents include the water soluble arsenic acid and nitrated benzene sulfonic or carboxylic acid.

QUINOPHTHALONES

*Example 5*

8-phenyl quinophthalone having the following formula:

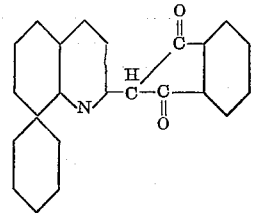

is obtained conveniently according to the general method for producing this product as described in Patent No. 1,963,374. Heat 41.6 parts of 8-phenyl-quinaldine (see Example 1) with 32.4 parts of phthalic anhydride dissolved in 81 parts of ortho dichlorbenzene. The reaction proceeds smoothly at/or near the distilling temperature and is finished after ten to fifteen hours. The water formed in the reaction is removed by distillation. To recover the product, 81 parts of orthene are added and the resulting solution is allowed to cool slowly. An orange-red needle product crystallizes which is separated by filtration and is washed with cold orthodichlorbenzene. The crystals may be purified further by first dissolving in orthodichlorbenzene and washing the solution while hot with dilute aqueous caustic soda. The orthodichlorbenzene is then washed with water to remove any residual alkali after which the solution is freed of water, and cooled. The crystals which separate are filtered, washed with alcohol and dried. The product melts at approximately 264–265° C. (uncorrected).

*Example 6*

Corresponding 6-phenyl quinophthalone is obtained in an analogous manner from the corresponding quinaldine of Example 2. Similarly, corresponding chlor substituted phenyl quinophthalones are obtained by the foregoing procedure. It is to be understood that the method by which the quinophthalone is produced does not form any part of the invention and that other procedures for preparing these products may be used.

*Example 7*

5-chlor-8-(parachlorphenyl) quinophthalone having the formula:

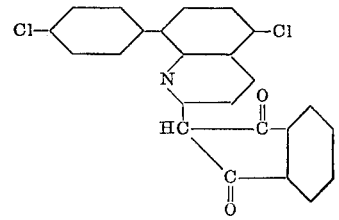

may be obtained by substituting the corresponding quinaldine intermediate for the 8-phenyl-quinaldine used in Example 6. To illustrate: 16.3 parts of 5-chlor-8-(parachlorphenyl) quinaldine (see Example 3) is heated for 12 hours at approximately 190–195° C. with 9.7 parts of phthalic anhydride and 32 parts of ortho dichlorbenzene. To remove the water formed during the reaction the mixture is boiled periodically whereby the water is carried out of the system and condensed. On cooling the reaction mixture orange-yellow needles are formed which are separated by filtration, washed with alcohol and dried. Residual phthalic anhydride may be removed from the crystals as in the preceding example by dissolving the product in dichlorbenzene, and washing the solution while hot with dilute aqueous caustic, after which residual caustic is removed by washing with water. By cooling the solution a crystalline product separates which is recovered by filtration followed by washing with alcohol.

The foregoing quinophthalones are spirit soluble and having marked dyeing properties. For most purposes the dyestuff is used in a water soluble form which is attained conveniently by sulfonation and separation of the sulfonated product as a salt. The salt is used in aqueous solution as the dyestuff, usually along with material such as sodium sulfate and the like, which facilitates the adsorption of the dyestuff on the textile fiber. The conditions for sulfonation are those commonly used in the art for accomplishing this common and well understood purpose. The following example illustrates an embodiment thereof.

SULFOQUINOPHTHALONE

*Example 8*

The 8-phenyl quinophthalone of Example 5 may be sulfonated according to the following procedure: 17.8 parts of 8-phenyl quinophthalone is added in small amounts with stirring to 40 parts of 100% $H_2SO_4$ over a period of 2 hours while maintaining a temperature of 30–32° C. Thereafter 35% oleum is added slowly while keeping the temperature below 44° C. (preferably around 40° C.). The oleum should be added in amounts varying from 5–10 parts after which the material is tested to determine whether sufficient quantity has been added. For this purpose 35–40 parts of oleum will usually be required. Sulfonation is complete when three drops of the sulfonated mixture added to 10 cc. of water dissolve completely. Over-sulfonation is objectionable in that it is difficult to salt out the sulfonated product.

After the sulfonation is completed, the product is poured on cracked ice. For this purpose approximately 150 parts by weight will be found to be sufficient. The quenched mixture is diluted with 200 parts of water, heated to effect solution, filtered and finally recovered by salting out by the addition of 100 parts by weight of salt. Upon cooling the sodium salt of the sulfo-8-phenyl quinophthalone separates. If desired, the product may be washed again with a 10% sodium chloride solution after which it is dried.

*Example 9*

The corresponding sulfo-6-phenyl quinophthalone salt is obtained in an analogous manner as is true also of the chlor substituted products.

The dyestuffs of this invention are used in a manner analogous to that employed in connection with the known quinoline yellow dyestuffs. They are suitable for both bath dyeing and lake dyeing.

In the claims I have used the prefix letter "C" to indicate the fact that the phenyl group is joined to the all carbon atom ring rather than the nitrogen containing ring of the quinaldine.

What I claim is:

1. A C-phenyl substituted quinaldine, said product being obtainable by condensation with croton-aldehyde of a monoaminodiphenyl having a reactive nuclear hydrogen adjacent to the amino group, said quinaldine being further characterized in that it is capable of condensing with phthalic anhydride to form the corresponding C-phenyl quinophthalone.

2. A C-chlorphenyl quinaldine which quinaldine is obtainable by condensation of croton-aldehyde with C-chlorphenyl aniline.

3. A substituted quinophthalone of the group consisting of C-phenyl quinophthalones in which the phenyl group is monocyclic and substituted on the benzene ring of the quinaldine group, and salts of C-phenyl quinophthalone sulphonic acids in which the phenyl group is monocyclic and substituted on the benzene ring of the quinaldine group.

4. The quinaldine defined in claim 1 and further characterized in that it is obtainable by condensation of croton-aldehyde with an amine selected from a group consisting of the following: orthoaminodiphenyl, 4'-chloro-2-aminodiphenyl, 4'-chloro-4-chloro-2-aminodiphenyl, 4-aminodiphenyl, 4-amino-2'-chlorodiphenyl and 4-amino-4'-chlorodiphenyl.

5. The process of preparing a C-phenyl quinophthalone which comprises condensing a monoaminodiphenyl having a reactive nuclear hydrogen adjacent to the amino group with croton-aldehyde to form a quinaldine structure, followed by condensation with phthalic anhydrid at the alpha methyl group in the C-phenyl quinaldine.

6. 8 - (parachlorophenyl)-5-chloro-quinophthalone.

LUCAS P. KYRIDES.